United States Patent [19]
Shiota

[11] Patent Number: 4,473,797
[45] Date of Patent: Sep. 25, 1984

[54] MULTIELEMENT-SENSOR MEASURING DEVICE

[75] Inventor: Kazuo Shiota, Minami-ashigara, Japan

[73] Assignee: Fuji Photo Film Co., Ltd., Minami-ashigara, Japan

[21] Appl. No.: 334,898

[22] Filed: Dec. 28, 1981

[30] Foreign Application Priority Data

Dec. 29, 1980 [JP] Japan .................. 55-185418

[51] Int. Cl.$^3$ .......................... G01R 1/38; G01R 1/02
[52] U.S. Cl. ................................ 324/115; 324/130; 340/870.13; 364/571
[58] Field of Search ................ 364/571; 340/870.13; 324/115, 74, 130

[56] References Cited

U.S. PATENT DOCUMENTS 2,753,547 7/1956 Donath ............................ 340/870.13
3,258,538 6/1966 Searcy ............................. 340/870.13
4,399,515 8/1983 Gross ................................... 364/571

*Primary Examiner*—Ernest F. Karlsen
*Assistant Examiner*—Ernest Austin, II
*Attorney, Agent, or Firm*—Fleit, Jacobson, Cohn & Price

[57] ABSTRACT

A multielement-sensor measuring device having a number of sensor elements is provided with a switching means, a measurement means, a memory data extraction means and an offset and gain compensation means. In adjustment of the device prior to actual measurement, the sensor elements are sequentially switched over to the measurement means which measures their output and produces and forwards to the memory for storage offset and gain values according to the variation in offset and gain among the sensor elements. During operation, the stored offset and gain values are extracted from the memory by the data extraction means and used to control the offset and gain compensation means, whereby the outputs from the sensor elements are compensated so as to be made free from variation in offset and gain.

4 Claims, 1 Drawing Figure

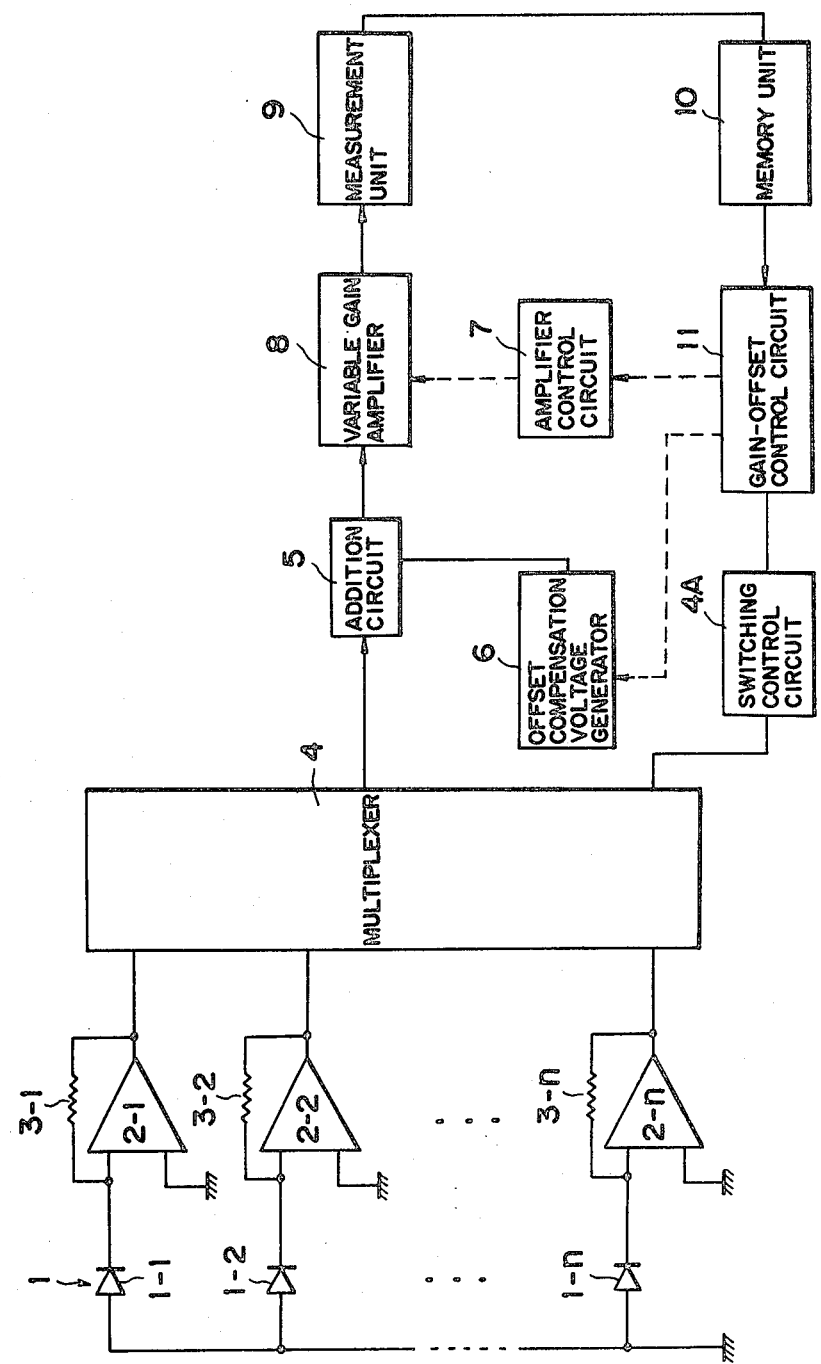

MULTIELEMENT-SENSOR MEASURING DEVICE

BACKGROUND OF THE INVENTION

1. Field of the Invention

This invention relates to a multielement-sensor measuring device and more particularly to an improvement in a device for compensating for variations in offset and gain among the individual elements in a multielement-sensor measuring device.

2. Description of the Prior Art

In the case of a line sensor array for light detection, for example, a circuit for compensating for the variation in gain (variation in sensitivity) and the variation in offset (variation in dark current) is required in order to measure minute amounts of light with good precision. For this type of circuit, there is usually used one in which amplifiers connected to the individual sensor elements are provided with variable resistors by which adjustment is made independently for each sensor element. In this specification, the term "individual element" will be used in some cases to mean a single unit element and in others to mean a circuit consisting of a single unit element and an amplifier connected thereto. In the circuit referred to above, the adjustment in gain is made to compensate for variation in the sensitivity and quantity of light among the individual elements and the adjustment for offset is made to compensate for variation in dark current among the individual elements and the offset of the amplifier itself. Depending on what is required of the measuring device, the output of the amplifiers is passed to the next stage of signal processing either via a multiplexer (switching means) or directly.

In the system just described it is necessary to provide two variable resistors for each individual sensor, one for gain adjustment and one for offset adjustment. This has the following disadvantages: (1) The cost is high; (2) The physical size of the circuit is large; and (3) Adjustment is troublesome.

In another system, the outputs from the individual elements are fed first to a multiplexer and from the multiplexer to an amplifier. Although this system is free from the disadvantages mentioned above, it has the following defects: (1) High-precision measurement is impossible since no compensation is made for variation in sensitivity and dark current among the individual elements; and (2) The measurement of small currents is difficult since the leak current etc. of the multiplexer has a direct effect on the sensor output.

SUMMARY OF THE INVENTION

The object of the present invention is to provide a multielement-sensor measuring device which can eliminate the above described disadvantages of the conventional devices.

Another object of the present invention is to provide a multielement-sensor measuring device capable of high-precision measurement without need for the provision of variable resistors for gain and offset adjustment on the amplifier for each individual sensor element.

In the multielement-sensor measuring device according to the present invention no variable resistors for gain and offset adjustment are provided on the amplifier for each individual sensor element. Instead, the outputs from the amplifiers are, without being compensated for variation in gain and offset, sequentially switched by a multiplexer or the like to the succeeding stage for measurement and the amplifier of the succeeding stage which receives the output from the multiplexer is constituted to have variable gain and variable offset. The gain and offset of this amplifier are adjusted according to which individual element (including its amplifier) of the sensor the multiplexer has selected, thus carrying out the aforesaid compensation (or correction). As measurement generally has to be carried out at high speed, it is also necessary to carry out the gain and offset adjustment of the amplifier at high speed. Therefore, the variation in gain and offset among the individual elements is stored in a memory in advance and the gain and offset of the amplifier are electrically controlled from the exterior on the basis of the stored values. This system is particularly effective when a microcomputer is used to carry out the control.

Although the multielement-sensor measuring device according to the present invention requires a memory circuit to store the gain and offset values for the individual element of the sensor, it does not require the provision of a variable resistor for gain and offset adjustment of each of the individual elements. Therefore, when the total number of elements is large, the overall cost of the device is lowered and, moreover, since the offset and gain are adjusted separately for each of the elements, the measuring precision is high.

The invention will now be described in further detail with respect to a preferred embodiment illustrated in the drawing.

BRIEF DESCRIPTION OF THE DRAWING

The FIGURE is a circuit diagram of the important part of a multielement-sensor measuring device in accordance with the present invention.

DESCRIPTION OF THE PREFERRED EMBODIMENT

In the FIGURE, the symbols 1-1, 1-2, ..., 1-n denote the individual sensor elements of a photosensor 1. To these elements 1-1, ..., 1-n are connected amplifiers 2-1, 2-2, ..., 2-n which are provided with fixed resistors 3-1, 3-2, ..., 3-n for converting current to voltage. The outputs of the amplifiers 2-1, ..., 2-n are all fed to a switching means, for example a multiplexer 4, controlled by a switching control circuit 4A. The output from the multiplexer 4 contains gain and offset variations.

The output terminal of the multiplexer 4 is connected to one input terminal of an addition circuit 5. The other input terminal of the addition circuit 5 is connected to the output terminal of an offset compensation voltage generator 6. The output terminal of the addition circuit 5 is connected to variable gain amplifier 8 which is electrically controlled by an amplifier control circuit 7. The output from the multiplexer 4 is adjusted for offset by the addition circuit 5 and is then adjusted for gain by the variable gain amplifier 8.

Control of the addition circuit 5 (the offset compensation voltage generator 6) and the variable gain amplifier 8 is carried out in the sequence described below by a measurement unit 9, a memory unit 10 and a gain-offset control unit 11.

At first, the outputs from the individual elements 1-1, 1-2, ..., 1-n at the time the photosensor 1 is not exposed to light are sequentially switched by the multiplexer 4 to the measurement unit 9 where they are measured. The output produced by the measurement unit 9 at this time is indicative of the overall variation in offset due to the variation in dark current of the photosensor 1 and the offsets of the amplifiers 2-1, 2-2, ..., 2-n. The output of the measurement unit 9 for each individual sensor element is stored in the memory unit 10. Next, the photosensor 1 is uniformly exposed to light in the absence of a measurement sample and the outputs of the sensor elements 1-1, 1-2, ..., 1-n are sequentially switched by the multiplexer 4 to the measurement unit 9 for measurement. The output of the measurement unit 9 at this time is indicative of the overall variation in gain due to the variation in the sensitivity of the individual sensor elements 1-1, 1-2, ..., 1-n and in the fixed resistors 3-1, 3-2, ..., 3-n. The output of the measurement unit 9 for each individual sensor element is stored in the memory unit 10.

The memory unit 10 is connected to the gain-offset control unit 11. The gain-offset control unit 11 is connected to the switching control circuit 4A from which it receives a signal identical to the switching control signal which the switching control circuit 4A applies to the multiplexer 4. The gain-offset control unit 11 uses this signal to extract from the memory unit 10 the gain and offset values for the specific sensor element whose output is to be measured. The offset value extracted in this way is forwarded from the gain-offset control circuit 11 to the offset compensation voltage generator 6 which produces an offset compensation voltage, namely a voltage of the same absolute value as, but of the opposite polarity from, the offset value. This offset compensation voltage is forwarded to the addition circuit 5 where it is added to the output of the sensor element, thus compensating this output for offset. On the other hand, the gain value extracted from the memory unit 10 is forwarded from the gain-offset control circuit 11 to the amplifier control circuit 7 which adjusts the gain of the output from the sensor element to a specified value on the basis of this gain value. In this way the output value of the sensor element is compensated to a value that is free from error due to variation in offset, sensitivity etc. The multielement-sensor measuring device according to the present invention thus makes it possible to conduct measurement with high precision.

As regards the actual components used in the device described above, it is possible, for example, to use an ordinary D-A converter for the offset compensation voltage generator 6, a multiplying D-A converter for the variable gain amplifier 8, an A-D converter for the measurement unit 9 and a microcomputer for the memory unit 10 and the gain-offset control unit 11. Thus it is possible to construct the device relatively easily without need for special components.

Also, it should be noted that in the embodiment described above, the photosensor can be replaced by a sensor for detecting temperature, sound or other physical quantity, or for detecting chemical quantities. Moreover, in a system in which it is possible to overlook the effect of leak current from the multiplexer, the first-stage amplifiers can be reduced to a single amplifier situated behind the multiplexer. It is also possible to constitute the circuit for compensation of gain only or offset only. In the case of gain compensation, moreover, the concept of the invention is not limited to the elimination of variation but also extends to the concept of weighting the gain for the individual sensor elements.

From the foregoing description, it will be clear that although the multielement-sensor measuring device according to the present invention requires a memory circuit for storing the gains and offsets of the individual sensor elements, there is no need to provide gain and offset adjustment means for each individual element. Therefore, where the sensor is composed of a large number of elements, the overall cost is lower than that of a conventional device. More specifically, the cost of the measuring device according to this invention is about the same as that of a conventional device when the number of individual sensor elements is about 10 and becomes progressively lower than that of a conventional device as the number of sensor elements increases above this level. Moreover, as the number of variable resistors requiring adjustment is fewer, little work is required for adjustment. More specifically, in a device utilizing 16 sensor elements, the time required for adjustment of a conventional device is about 10 minutes, figuring about 30 seconds per variable resistor. With the device according to the present invention on the other hand, the required time is about 1 second, with some variation depending on the sequence used. Further, as the number of space-consuming variable resistors is smaller, there is also a reduction in size. Moreover, where the measurement unit is a part of the device itself, gain and offset adjustment are made easier as a whole. Other advantages in the case of using a microcomputer etc. for control are that it becomes easy to check out malfunctions of the elements or the circuitry, and that, since the sequence for measuring and memorizing variation in gain and offset can easily be automated, adjustment prior to actual measurement is simple so that it becomes possible to carry out consistent measurement free from the effects of time-course and temperature changes. One particularly effective application of the present invention is in the high-precision measurement of three-color density balance, as in the measurement of the three-color analysis of the spot density of a color negative.

I claim:

1. A multielement-sensor measuring device comprising a sensor consisting of a plurality of sensor elements, a measurement means for independently measuring the output, offset and gain values of each sensor element, a switching means for sequentially switching said sensor elements over to said measurement means, a memory means for storing the offset and gain values separately for each sensor element, an extraction means for extracting from said memory means the offset and gain values for each of the sensor elements switched by said switching means, and offset compensation means provided between said switching means and said measurement means for compensating the offset of the output of said sensor elements on the basis of the offset value extracted by said extraction means, and a gain compensation means provided between said switching means and said measurement means for compensating the gain of the output of said sensor elements to a specified value on the basis of the gain value extracted by said extraction means.

2. A multielement-sensor measuring device according to claim 1 wherein said sensor is a sensor for detecting light.

3. A multielement-sensor measuring device according to claim 1 wherein said sensor is a sensor for detecting sound.

4. A multielement-sensor measuring device according to claim 1 wherein said sensor is a sensor for detecting heat.

* * * * *